United States Patent
Morris et al.

(10) Patent No.: US 10,619,059 B1
(45) Date of Patent: Apr. 14, 2020

(54) CATALYST INK FOR THREE-DIMENSIONAL CONDUCTIVE CONSTRUCTS

(71) Applicant: Science Applications International Corporation, Reston, VA (US)

(72) Inventors: David Morris, Bloomington, IN (US); John Timler, River Ridge, LA (US); Jason Schipp, Jasper, IN (US)

(73) Assignee: Science Applications International Corporation, Reston, VA (US)

( * ) Notice: Subject to any disclaimer, the term of this patent is extended or adjusted under 35 U.S.C. 154(b) by 0 days.

(21) Appl. No.: 16/447,277

(22) Filed: Jun. 20, 2019

(51) Int. Cl.
| | |
|---|---|
| C09D 11/03 | (2014.01) |
| C09D 11/52 | (2014.01) |
| C23C 18/16 | (2006.01) |
| C23C 18/18 | (2006.01) |
| C23C 18/20 | (2006.01) |
| C23C 18/30 | (2006.01) |
| C23C 18/38 | (2006.01) |
| B33Y 10/00 | (2015.01) |
| B33Y 70/00 | (2020.01) |
| B33Y 40/00 | (2020.01) |
| B82Y 30/00 | (2011.01) |

(52) U.S. Cl.
CPC ............ *C09D 11/03* (2013.01); *C23C 18/161* (2013.01); *C23C 18/1637* (2013.01); *C23C 18/1662* (2013.01); *C23C 18/38* (2013.01); *B33Y 10/00* (2014.12); *B33Y 40/00* (2014.12); *B33Y 70/00* (2014.12); *B82Y 30/00* (2013.01)

(58) Field of Classification Search
None
See application file for complete search history.

(56) References Cited

U.S. PATENT DOCUMENTS

| | | | | |
|---|---|---|---|---|
| 3,011,920 | A | * 12/1961 | Shipley, Jr. | ............. C23C 18/28 106/1.11 |
| 5,227,223 | A | * 7/1993 | Morgan | .................. C23C 18/28 174/257 |
| 6,116,718 | A | 9/2000 | Peeters et al. | |
| 6,126,740 | A | 10/2000 | Schulz et al. | |
| 7,981,508 | B1 | 7/2011 | Sharma et al. | |

(Continued)

FOREIGN PATENT DOCUMENTS

EP    2649141 A2    10/2013

OTHER PUBLICATIONS

Jeong Hoon Byeon, et al., "Site-Selective Catalytic Surface Activation via Aerosol Nanoparticles for Use in Metal Micropatterning", American Chemical Society Langmuir, May 7, 2008, pp. 5949-5954.

(Continued)

*Primary Examiner* — Helene Klemanski
(74) *Attorney, Agent, or Firm* — Banner & Witcoff, Ltd.

(57) ABSTRACT

A method of constructing conductive material in arbitrary three-dimensional (3D) geometries, such as 3D printing. The method may include selective application of an aerosol-based colloidal solution containing a catalytic palladium nanoparticle material onto a substrate and then immersion of the coated substrate into an electro-less plating bath for deposition of conductive copper material. The above steps may be repeated to create arbitrary 3D geometric constructs containing conductive metallic patterns.

18 Claims, 6 Drawing Sheets

(56) References Cited

U.S. PATENT DOCUMENTS

| | | | |
|---|---|---|---|
| 7,989,029 B1 | 8/2011 | Dhau et al. | |
| 8,110,254 B1 | 2/2012 | Sharma et al. | |
| 8,124,226 B2 | 2/2012 | Sharma et al. | |
| 8,628,818 B1 | 1/2014 | Sharma et al. | |
| 8,895,874 B1 | 11/2014 | Sharma et al. | |
| 8,911,608 B1 | 12/2014 | Sharma et al. | |
| 2005/0173374 A1* | 8/2005 | Cohen | B81C 1/00492 216/41 |
| 2005/0238812 A1* | 10/2005 | Bhangale | C23C 18/1608 427/304 |
| 2005/0260350 A1* | 11/2005 | Shipway | H05K 3/102 427/304 |
| 2006/0163744 A1* | 7/2006 | Vanheusden | B82Y 30/00 257/773 |
| 2006/0189113 A1* | 8/2006 | Vanheusden | B22F 1/0018 438/597 |
| 2006/0269824 A1* | 11/2006 | Hampden-Smith | B01J 21/18 502/101 |
| 2009/0061077 A1* | 3/2009 | King | B01D 45/08 427/75 |
| 2009/0239363 A1 | 9/2009 | Leung et al. | |
| 2010/0075026 A1* | 3/2010 | Sung | C23C 18/1608 427/97.2 |
| 2011/0303885 A1* | 12/2011 | Vanheusden | H01B 1/22 252/513 |
| 2012/0145554 A1* | 6/2012 | Liu | C23C 18/161 205/187 |
| 2012/0171363 A1* | 7/2012 | Yamamoto | C23C 18/1653 427/99.1 |
| 2012/0309193 A1* | 12/2012 | Wu | C23C 18/08 438/686 |
| 2013/0216713 A1* | 8/2013 | Liu | B01J 23/44 427/305 |
| 2013/0221288 A1* | 8/2013 | Liu | H01B 1/02 252/514 |
| 2014/0035995 A1* | 2/2014 | Chou | C09D 11/101 347/20 |
| 2014/0242287 A1* | 8/2014 | Kwong | C23C 18/30 427/443.1 |
| 2014/0329054 A1* | 11/2014 | Theivanayagam Chairman | B41M 1/00 428/156 |
| 2015/0237742 A1* | 8/2015 | Nakamura | C23C 18/1893 427/97.2 |
| 2017/0015804 A1* | 1/2017 | Bashir | C09D 5/38 |
| 2017/0081766 A1* | 3/2017 | Hsu | C23C 18/34 |
| 2017/0283629 A1* | 10/2017 | Fortier | C09D 11/30 |
| 2018/0258306 A1* | 9/2018 | Shukla | C09D 101/12 |

OTHER PUBLICATIONS https://www.optomec.com/printed-electronics/aerosol-jet-technology/, 2018, 8 pages.

* cited by examiner

CATALYST INK FOR THREE-DIMENSIONAL CONDUCTIVE CONSTRUCTS

GOVERNMENT LICENSE RIGHTS

This invention was made with Government support under Contract No. N00178-04-D-4119-FC2846 awarded by the U.S. Department of Defense. The Government has certain rights in this invention.

BACKGROUND

To date there has not been an effective deposition process for metallic compounds that provides conductivity on par with bulk metal in arbitrary three-dimensional geometries. In particular, current ink or aerosol based precursors used in such additive manufacturing processes do not provide the desired conductivity in the product material. Three-dimensional metal shapes printed with current inks only achieve 30% of the conductivity of their bulk material counterparts.

SUMMARY

The following presents a simplified summary in order to provide a basic understanding of the disclosure. The summary is not an extensive overview of the disclosure. It is neither intended to identify key or critical elements nor to delineate the scope of the disclosure. The following summary merely presents some concepts in a simplified form as a prelude to the more detailed description below.

A catalyst ink may comprise a colloidal solution of a solvent and palladium nanoparticles. The colloidal solution may comprise a binder. The catalyst ink may be used to form a three-dimensional construct. A method of forming a three-dimensional construct may comprise preparing a catalyst ink by forming a colloidal solution comprising catalytic nanoparticles and a solvent. The catalytic ink may be deposited onto a surface of a substrate. The ink may be deposited, for example, using aerosol jet printing. The substrate may be subjected to electro-less plating to plate the deposited nanoparticles with metal. One or more of these steps may be repeated until a three-dimensional construct having a desired size and/or shape is formed.

DESCRIPTION

The present disclosure is directed to the preparation of arbitrary three-dimensional (3D) geometric conductive constructs. The term "arbitrary" is intended to convey that the constructs may be of a variety of shapes and sizes. The constructs may be used to form microelectronic circuitry, which can be used for flexible sensors, transistors, connective wiring, etc.

A process for preparing arbitrary 3D shapes may include additive or subtractive manufacturing techniques. In addition, the layers in the construct may be partly conductive and partly non-conductive. For example, a non-reactive ink may be utilized to build one or more portions of the 3D construct to form a non-conductive layer and then a catalyst ink may be used to build one or more portions of the 3D construct. Thus the process provides conductive metallic patterns.

The process of making the 3D conductive constructs may use a colloidal solution containing a catalytic nanoparticle material, for example palladium. The colloidal solution may be an aerosol-based solution and may be referred to as a catalyst ink. The catalyst ink may be applied onto a substrate using aerosol jet printing. "Aerosol jet printing" and an "aerosol jet printing process" refer to printing processes whereby liquid is projected from a nozzle directly onto a substrate to form a desired pattern.

The catalytic nanoparticle material may be disposed in minute amounts on the surface. The catalytic nanoparticle material, and/or a layer of such materials, may itself be nonconductive. The catalytic nanoparticle material may facilitate subsequent deposition of a metal onto the surface, according to the pattern of the catalytic nanoparticle material previously deposited, so as to form conductive layers in the 3D construct.

For example, the catalytic nanoparticle material coated substrate may be immersed into an electro-less plating bath for deposition of conductive material such as copper onto the nanoparticles. The above steps may be repeated to create the desired 3D conductive constructs.

Figure 2:
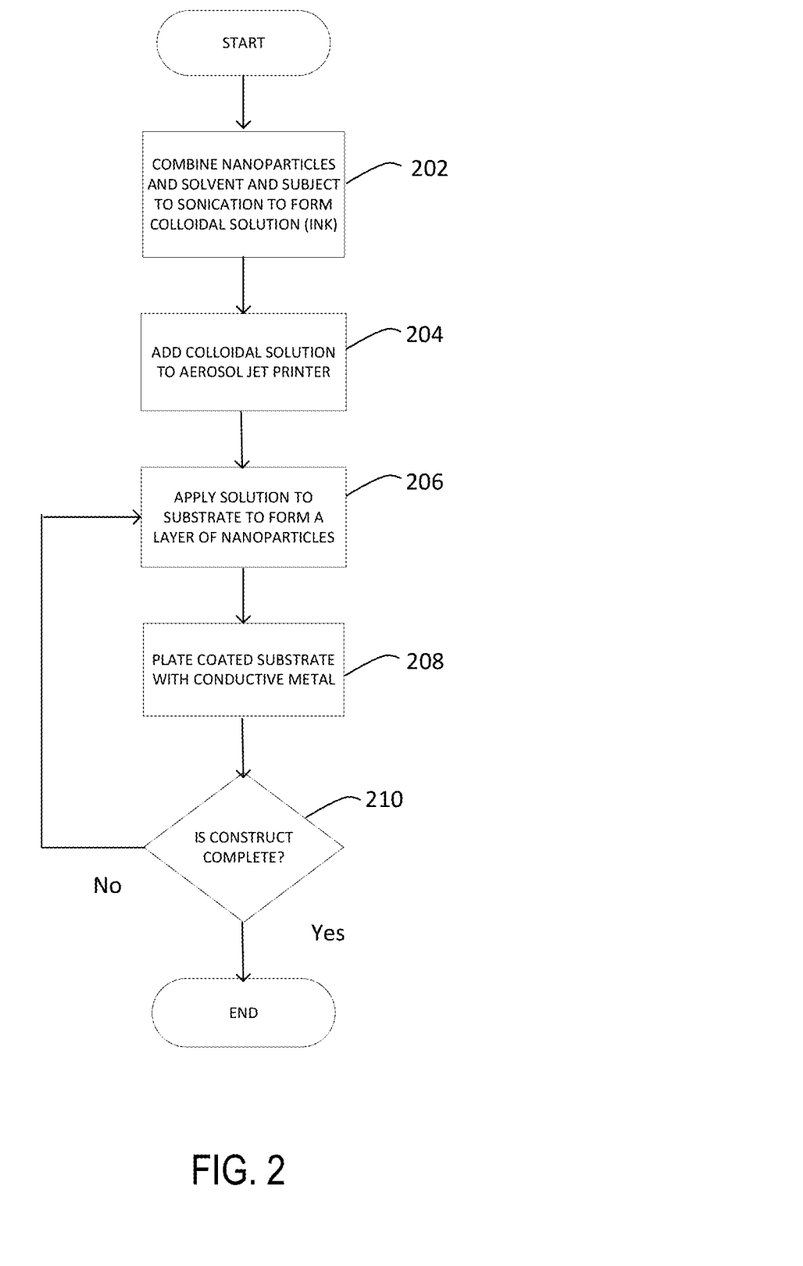
FIG. 2 shows a flow chart of a method of preparing a 3-D construct in accordance with one aspect of the disclosure.
Figure 3:
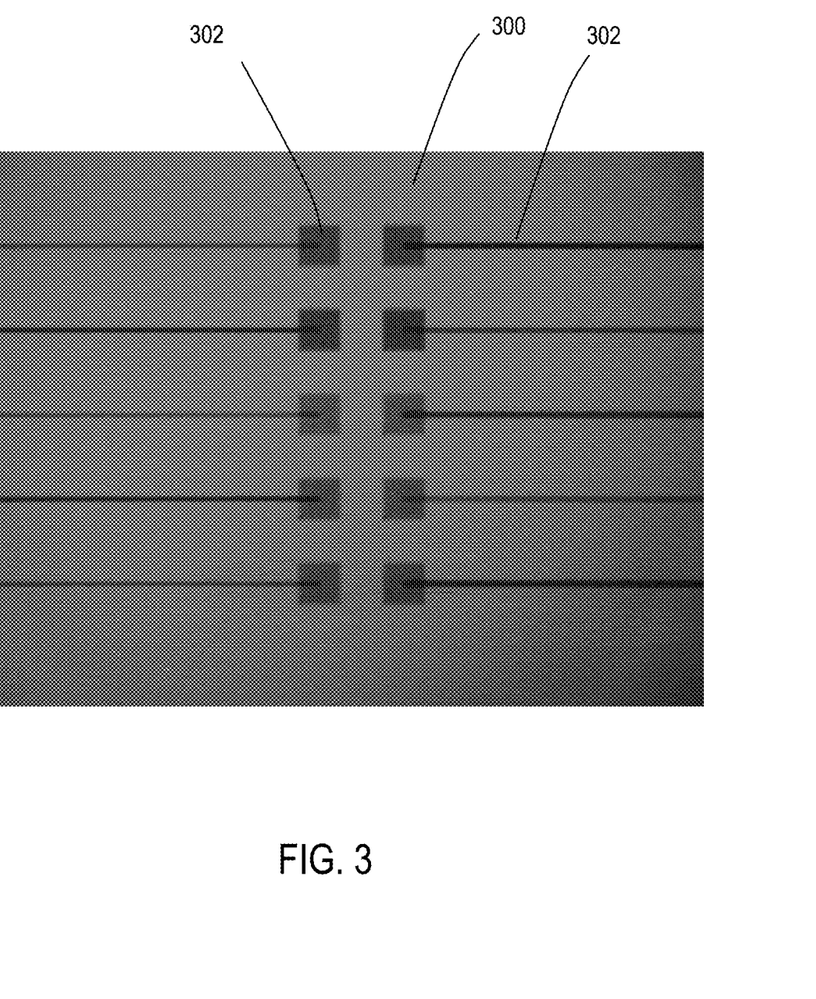
FIG. 3 shows an example of palladium traces before addition of copper with 1% palladium in accordance with one aspect of the disclosure.
Figure 4:
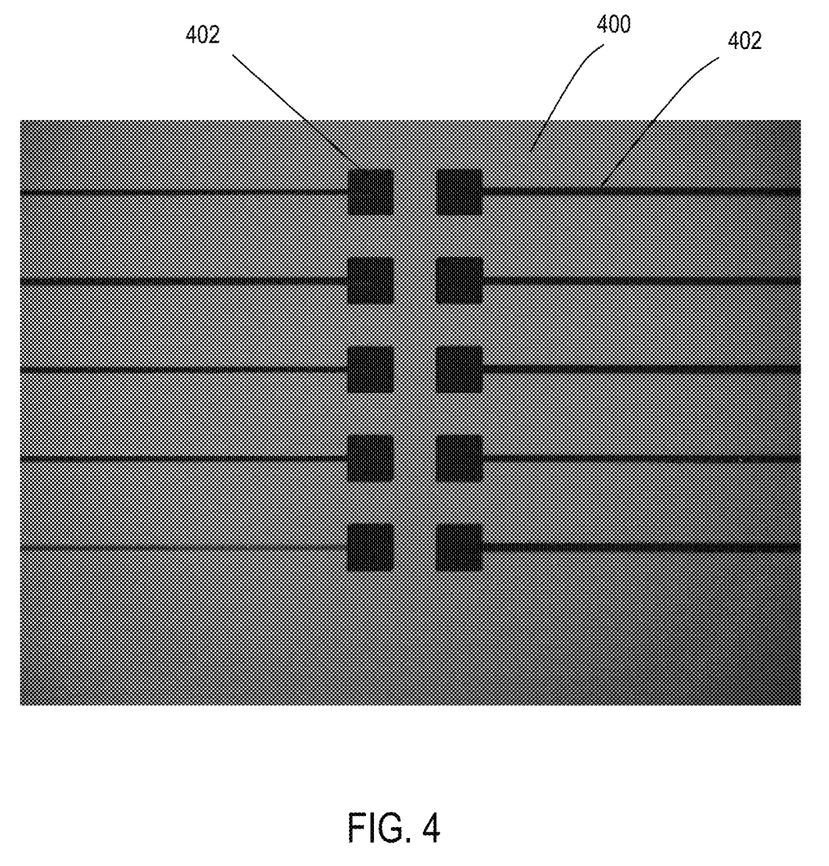
FIG. 4 shows an example of palladium traces before addition of copper with 0.5% palladium in accordance with one aspect of the disclosure.
Figure 5:
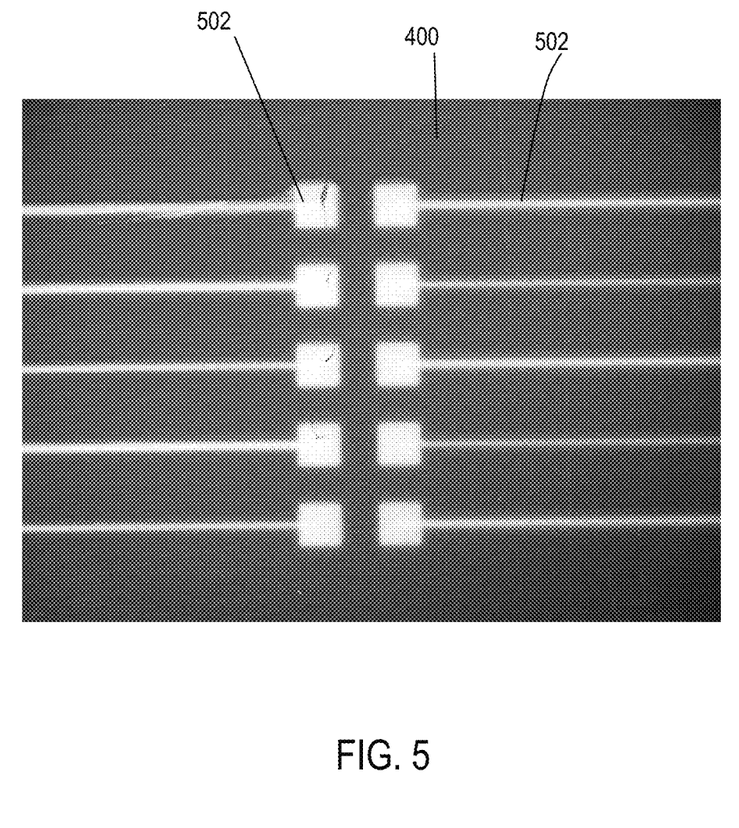
FIG. 5 shows an example of a copper construct in accordance with one aspect of the disclosure.
Figure 6:
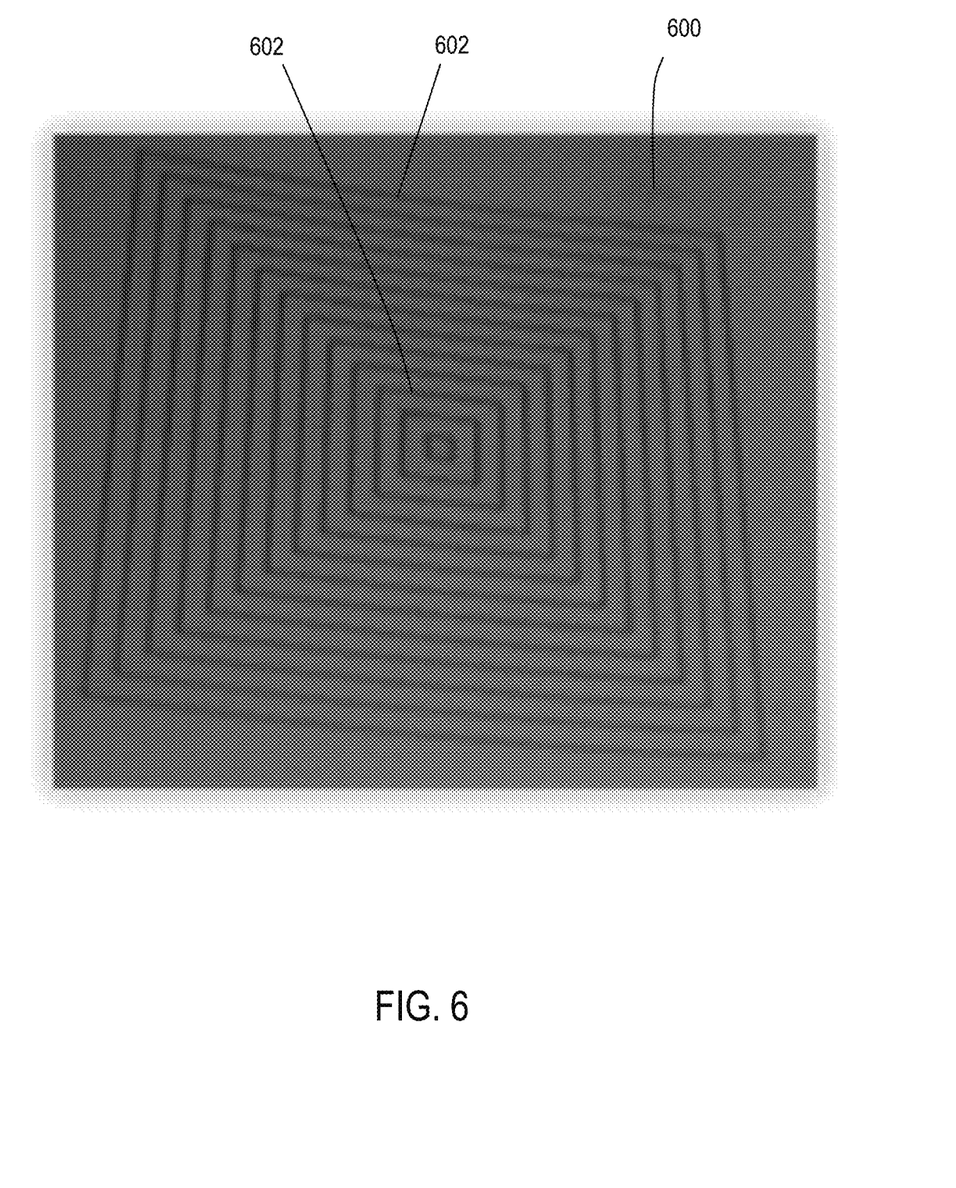
FIG. 6 shows an example of a copper construct in accordance with another aspect of the disclosure.

Attention is drawn to FIG. 2 which shows a flow diagram that may be used to apply conductive layers to form a 3D construct. In step 202, nanoparticles and solvent may be combined and subjected to sonication to form a colloidal solution. In step 204, the colloidal solution may be added to an aerosol jet printer. In step 206, the solution may be applied to a substrate to form a layer of nanoparticles. In step 208, the coated substrate may be plated with a conductive metal. In step 210, a determination may be made with regard to whether the 3D construct is complete. If not complete, steps 206-210 may be repeated until the 3D construct is complete.

The catalyst ink (colloidal or aerosol-based solution) may contain catalytic nanoparticles, solvents, and optionally a binder.

The nanoparticles may be any suitable palladium nanoparticles that one can use to build a 3D geometric conductive construct. Active palladium is catalytic for subsequent addition of a metal onto the palladium and strongly attaches to the underlying substrate. Palladium may be used, in particular, for copper plating. Hence, after appltion of the palladium particles, for example, the construct may be immersed in an electro-less plating bath for appltion of the copper.

The catalytic nanoparticles may be of any suitable size for deposition and buildup of the 3D construct. For example, the average particle size may be from 15 to 400 nm in size. The average particle sizes may be a consistent size or may be random within the range or may have groups of larger and smaller particles within the range, for example 15 to 200 nm, 15 to 100 nm, 15 to 50 nm, 100 to 400 nm, 200 to 400 nm, 300 to 400 nm, 100 to 300 nm or 15 to 250 nm or any combination thereof.

The colloidal solution may contain a suitable concentration of catalytic nanoparticles to provide the desired layer of particles. The concentration of catalytic nanoparticles in the solution may be limited so as to avoid clogging the nozzle of the appltor. The colloidal solution may contain from 0.1 to 2.2 wt. % nanoparticles, for example, from 0.1 to 1.5 wt. %, 0.1 to 1.0 wt %, 0.1 to 0.5 wt. %, 0.5 to 2.2 wt. %, 1 to 2.2 wt %, 1.5 to 2.2 wt. %, or 0.5 to 1.5 wt. %. The concentration may be any suitable concentration to obtain the desired layer thickness on the substrate.

The solvent may be any suitable solvent to provide a colloidal solution of the catalytic nanoparticles and suitable for spraying to build the 3D construct. Suitable solvents include, but are not limited to, toluene, dimethylformamide, tetrahydrofuran, xylenes, and combinations thereof.

A binder may be utilized to increase the substrate/catalyst interaction. With certain substrates, no binder is utilized. The selection of a binder and type of binder may depend, at least in part, on the characteristics of the substrate, the solvent, and the catalytic nanoparticles. Suitable binders for palladium nanoparticles include, but are not limited to, poly-vinyl alcohol and carboxy-methyl cellulose or combinations thereof. The type and amount of binder is dependent on the substrate but generally does not exceed more than 1% of total solution.

Other processing aids may be included so long as they do not interfere with the desired 3-D construct.

The colloidal solution components may be mixed together. The resulting solution may be sonicated to reduce aggregation of the nanoparticles and disperse the nanoparticles in solution. Such sonication may occur just prior to dispersion to ensure the nanoparticles have not aggregated and/or settled. The colloidal solution may be sonicated for up to 20 minutes, typically 10 to 15 minutes. The resulting solution may have a viscosity of less than 1000 cP measured at room temperature to allow suitable flow.

Figure 1:
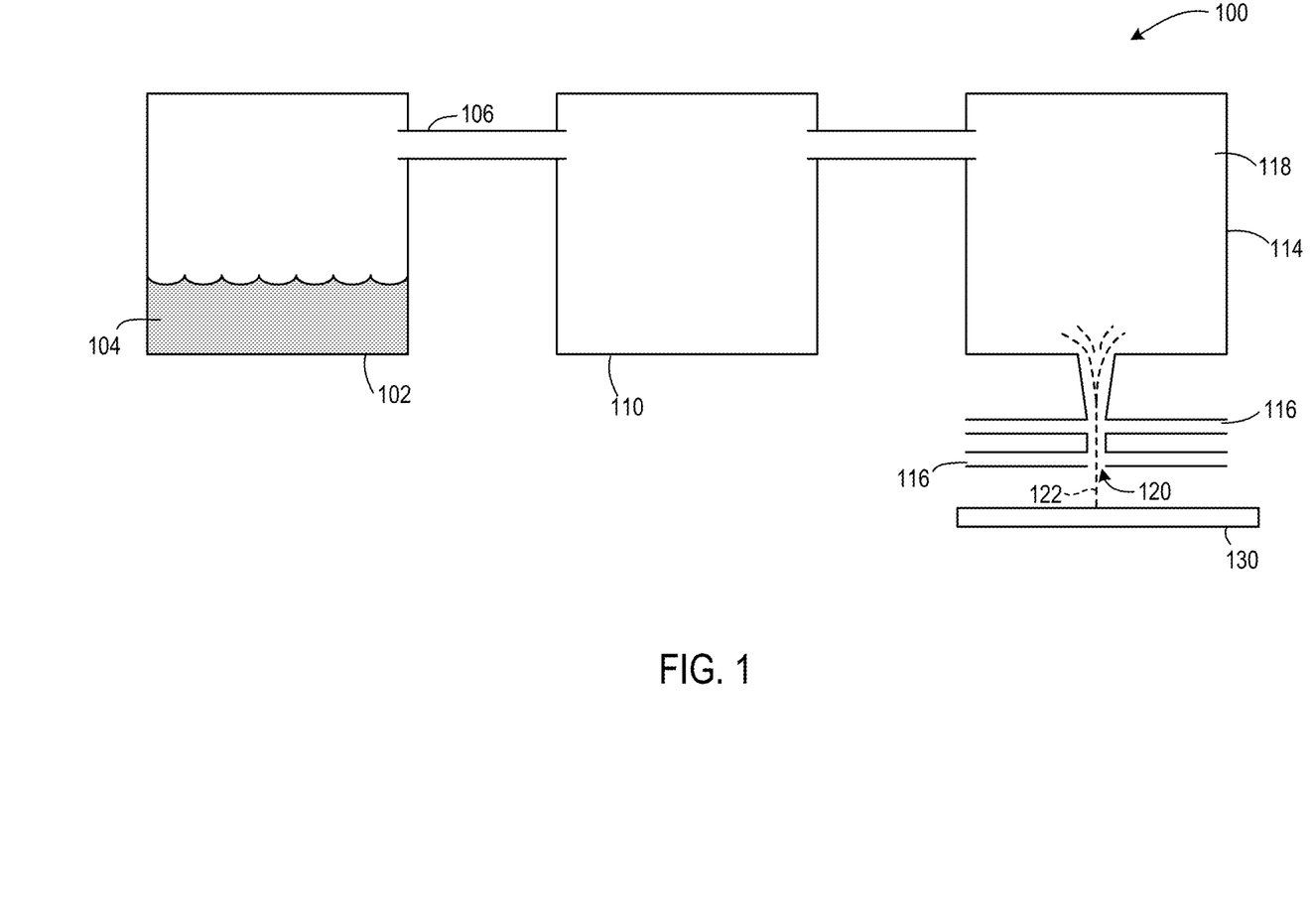
FIG. 1 shows an example aerosol jet system used to apply nanoparticles in accordance with one aspect of the disclosure.

In an aerosol jet printer 100, illustrated in FIG. 1, an atomizer 102 atomizes a liquid 104 (e.g., an ink such as a colloidal solution). The atomized fluid 106 enters a virtual impactor 110 to remove excess gas, and then is aerodynamically focused using a flow guidance deposition head 114, which creates an annular flow of sheath gas, indicated by arrow 116, to collimate the atomized fluid 118. The co-axial flow exits the flow guidance head 114 through a nozzle 120 directed at the substrate 130 and focuses a stream 122 of the atomized material. Patterning may be accomplished by attaching the substrate to a computer-controlled platen, or by translating the flow guidance head while the substrate position remains fixed. An example of an aerosol jet printer suitable for use includes, but is not limited to, an M3D Aerosol Jet Deposition System available from Optomec, Inc., of Albuquerque, N.M.

The system may use a single nozzle or a plurality of nozzles (e.g. 1, 2, 3, 4, 5, or more nozzles.) The nozzles may be attached to a multiplex or other system to allow non-conformal printing—e.g. control of the nozzle(s) in a 3-dimensional environment.

The colloidal solution may be loaded into a pneumatic atomizer chamber of the aerosol jet printer. A liquid stream of the colloidal solution may be atomized using a high-velocity atomization gas stream. This high-velocity gas shears the liquid stream into droplets thus forming an aerosol stream. The droplets may be of any suitable size for appltion to the substrate or construct. Typically the droplets range from 1 to 5 μm, for example, with an average size of 2.5 μm. Suitable atomization gases may be inert gases such as nitrogen or argon or compressed air. Nitrogen may be preferred over argon as it is less expensive.

Excess atomization gas may be removed from the aerosol stream by a virtual impactor which then concentrates the aerosol stream and channels the aerosol stream through a deposition head. A sheath gas stream surrounds the aerosol stream and focuses the stream onto the substrate forming a layer of nanoparticles on the substrate or on the construct already present.

The process of applying the nanoparticles may occur at a temperature of from 0 to 60 degrees Celsius to the print bed.

The print thickness of each layer may be 100 nanometers to tens of microns. A typical range is from 0.5 to 1.5 microns.

The substrates may be standard 2D substrates or additively manufactured 3D constructs. More particularly, the substrates may be flat sheets or they may be 3D structures that were made using additive manufacturing from a 3D printer. Substrates may be made of glass, plastics, ceramics, and metals. The substrate may be any substrate that the colloidal solution gets printed on. A plate of ceramic may be a substrate or a 3D printed plastic pyramid may be a substrate. The substrate becomes part of the product.

After appltion of the metal precursor, the substrate may be allowed to dry. FIG. 3 shows a substrate 300 coated utilizing 1% palladium solution to form structure 302. FIG. 4 shows a substrate 400 coated utilizing 0.5% palladium solution to form structure 402. These structures may be used in microelectronic circuitry.

The palladium coated substrate may be metallized by immersing in an electro-less plating bath. For example, substrate having a layer of palladium nanoparticles may be immersed in a copper bath whereby the copper plates onto the palladium. The solvent may be left to evaporate, for example, the substrate may sit in room temperature for 2 hours, or placed in an oven, for example, at 50 to 60 degrees Celsius for 30 minutes.

Subsequent process steps may include washing the copper plating. Washing may be with water, an acid solution such as sulfuric acid, and/or anti-tarnish. As a non-limiting exemplification, the plated sample may be washed with deionized (DI) water for two minutes, washed with 10% sulfuric acid for 1 minutes, 45 seconds, rinsed with DI water again for 1 minute, then washed with anti-tarnish solution for 1 minute, and lastly washed with DI water for one minute.

The process may be repeated to add additional conductive metal layers to the substrate constructs. The process may also include appltion of non-catalytic or non-metallic layers. FIG. 5 shows substrate 400 where the palladium has been coated in copper to form a conductive, flexible wire 502 which may be used in microelectronic circuitry FIG. 6 shows another substrate 600 coated with palladium to form structure 602 which may be used in microelectronic circuitry.

The resulting metal 3D structure (construct) may have a conductivity on par with bulk metal counterparts that require sintering (e.g. silver constructs).

As discussed above, an aerosol system may use a sheath of gas to channel the colloidal solution through the print head. The sheath gas allows the colloidal solution to channel through the print head without touching the nozzle walls. This creates a clog resistant nozzle and a tightly focused, high density stream onto the substrate.

An advantage of the aerosol system is that it can produce a much higher print resolution than that of standard ink jet systems. The aerosol system is also more lenient than ink jet with ink viscosity and print head standoff. The variable print head standoff offered by the aerosol jet system allows nanoparticles to be printed on variable surface features that would simply not be possible with an ink jet printer. This allows for printing on 3-dimensional surfaces, which ink jet systems cannot do.

Additional aspects include a catalytic ink comprising palladium, a solvent selected from toluene, dimethylformamide, tetrahydrofuran, xylenes, and combinations thereof, and optionally a binder selected from poly-vinyl alcohol and carboxy-methyl cellulose.

Examples

A copper construct made in accordance with the process of using a palladium ink and an aerosol system as described herein was compared to a silver construct prepared with an industry standard silver ink using the same aerosol system. The palladium construct showed improvements over the silver constructs. Three passes with the Optomec M3D Aerosol Jet Deposition System, Inc. using silver ink provided resistances of 14.5 to 27 ohms, after sintering the silver for 5 hours at 205 C°. Three passes with the palladium ink followed by copper plating provided a resistance of 3.26 to 5.75 ohms, with no sintering at high temperatures being required.

The invention has been described with respect to specific examples including various aspects of the invention. Those skilled in the art will appreciate that there are numerous variations and permutations of the above described systems and techniques. Thus, the spirit and scope of the invention should be construed broadly as set forth in the appended claims.

We claim:

1. A method of forming a three-dimensional construct comprising
   i. preparing a catalyst ink comprising a colloidal solution comprising a solvent and palladium nanoparticles; and
   ii. depositing the catalyst ink from step (i) onto a surface of a substrate using aerosol jet printing;
   iii. subjecting the substrate to electro-less plating to plate the palladium nanoparticles with copper; and
   iv. repeating steps ii and iii until the three-dimensional construct is formed.

2. The method of claim 1 further comprising sonicating solvent in step i to disperse the palladium nanoparticles and to reduce aggregation of the palladium nanoparticles.

3. The method of claim 1 wherein the solvent is selected from toluene, dimethylformamide, tetrahydrofuran, xylenes, and combinations thereof.

4. The method of claim 1 wherein the catalyst ink further comprises a binder selected from poly-vinyl alcohol and carboxy-methyl cellulose or combinations thereof.

5. The method of claim 1 wherein the palladium nanoparticles have an average particle size of from about 15 to about 400 nm.

6. The method of claim 1 wherein the palladium nanoparticles are present in the solution in an amount of from 0.1 to 2.2 wt. % based on total weight of the solution.

7. The method of claim 1 wherein the substrate is selected from glass, plastic, ceramic, or metal.

8. The method of claim 1 further comprising
   v. applying a non-conductive layer prior to or after repeating steps ii and iii.

9. The method of claim 1 wherein the palladium nanoparticles have an average particle size of from about 15 to about 100 nm.

10. The method of claim 1 wherein the palladium nanoparticles have an average particle size of from about 200 to about 400 nm.

11. A method of forming a three-dimensional construct comprising
    i. preparing a catalyst ink comprising a colloidal solution comprising palladium nanoparticles and a solvent selected from toluene, dimethylformamide, tetrahydrofuran, xylenes, and combinations thereof;
    ii. sonicating the catalyst ink to disperse the palladium nanoparticles and to reduce aggregation of the palladium nanoparticles;
    iii. depositing the catalyst ink from step (ii) onto a surface of a substrate using aerosol jet printing;
    iv. subjecting the substrate to electro-less copper plating to plate the palladium nanoparticles with copper; and
    v. repeating steps iii and iv until the three-dimensional construct is formed.

12. The method of claim 11 wherein the palladium nanoparticles have an average particle size of from about 15 to about 400 nm.

13. The method of claim 11 wherein the palladium nanoparticles are present in the solution in an amount of from 0.1 to 2.2 wt. % based on total weight of the solution.

14. The method of claim 11 wherein the catalyst ink further comprises a binder selected from poly-vinyl alcohol and carboxy-methyl cellulose or combinations thereof.

15. The method of claim 11 wherein the substrate is selected from glass, plastic, ceramic, or metal.

16. The method of claim 11 further comprising
    vi. applying a non-conductive layer prior to or after repeating steps iii and iv.

17. The method of claim 11 wherein the palladium nanoparticles have an average particle size of from about 15 to about 100 nm.

18. The method of claim 11 wherein the palladium nanoparticles have an average particle size of from about 200 to about 400 nm.

* * * * *